United States Patent [19]

van der Burgt

[11] 4,360,306

[45] Nov. 23, 1982

[54] METHOD AND DEVICE FOR THE FEEDING OF FINELY DIVIDED SOLID MATTER TO A GAS-CONTAINING VESSEL

[75] Inventor: Maarten J. van der Burgt, The Hague, Netherlands

[73] Assignee: Shell Oil Company, Houston, Tex.

[21] Appl. No.: 201,256

[22] Filed: Oct. 27, 1980

[30] Foreign Application Priority Data

Nov. 14, 1979 [NL] Netherlands ............... 7908314

[51] Int. Cl.³ ............................................. C10J 3/50
[52] U.S. Cl. .................................. 414/217; 48/86 R; 414/301; 414/786
[58] Field of Search ............ 414/217, 301, 786; 239/223, 224; 406/71; 48/86 R

[56] References Cited

U.S. PATENT DOCUMENTS 4,197,092 4/1980 Bretz ................................... 48/86 R
4,256,580 5/1981 Meyer ................................. 414/217

*Primary Examiner*—Robert G. Sheridan

[57] ABSTRACT

Method and apparatus for introducing finely divided solids, especially particulate coal, into a gas-containing vessel, utilizing a centrifugal pump having a feed inlet and a rotor. The rotor is surrounded by a second gas of lower density than the first gas in the vessel in order to reduce friction. The second gas can be at a lower pressure or a lower molecular weight than the first gas, low pressure hydrogen being preferred.

14 Claims, 2 Drawing Figures

METHOD AND DEVICE FOR THE FEEDING OF FINELY DIVIDED SOLID MATTER TO A GAS-CONTAINING VESSEL

FIELD OF THE INVENTION

The invention relates to a method and apparatus for the feeding of finely divided solids to a gas-containing vessel by means of a centrifugal pump which comprises a rotor rotatably arranged in the vessel and a feed inlet mounted in a hollow shaft connected to the rotor.

DESCRIPTION OF THE PRIOR ART

Centrifugal pumps of this type are known from the U.S. Pat. Nos. 2,822,097, 3,182,825, 4,049,133 and 4,120,410. Such pumps are most useful if a difference in pressure has to be overcome, in other words, if the gas in the vessel has another, often higher, pressure than that of the atmosphere outside the vessel. These pumps are used to feed powders or granulated materials, both reactants and catalysts, to some reaction space in which the pressure is higher than outside. It is obvious that these pumps may also be used in situations without pressure difference.

Examples of processes in which these pumps are or may be applied are coal gasification, coal combustion under pressure, supercritical gas extraction, iron ore reduction with solid fuel injection and the feeding of catalyst to a catalytic cracking unit or the feeding of limestone or dolomite to a sulphur removal installation under pressure.

When these pumps are used, the solid particles are cast through the feed inlet onto the rotating rotor during operation. The rotor may be a single circular plate, optionally profiled or better grip, although modern centrifugal pumps mostly comprise two rotating discs inbetween which the solid particles are fed. Sometimes they are provided with channels which are termed centrifugal nozzles, although there are also rotors having a "360° slot". As a result of the centrifugal effect the particles are hurled from the rotor and leave the periphery with a radial and a tangential velocity component. In the usual embodiments the rotor has a rotational speed of 500-5,000 revolutions per minute (rev. per min.) and the particles acquire a radial velocity of approximately 10 meters per second (m/s) and a tangential velocity of approximately 100 m/s. Driving the rotor then requires energy at the approximate rate of 5-15 kilowatt hour per ton (kWh/ton) of material per hour, depending on the capacity, and in the case of large pumps, it is expedient to investigate ways and means of saving energy.

So far it has been insufficiently appreciated that only a small part of the energy supplied to the rotor, approximately 10-50 percent (%), is used to advantage, that is, to accelerate the solid particles sufficiently to overcome the gas pressure prevailing in the vessel. The remaining energy is lost, for example by friction in bearings, leakage of gas, turbulences in the flow of particles and in particular friction between the rapidly rotating motor and the gas present in the vessel. When a high pressure prevails in the vessel and when the rotor operates at a comparatively high velocity, this friction is considerable. The resultant loss of power is approximately 40-80%, depending on the rate of delivery. The loss of power increases with the rotor diameter and the angular velocity. It would therefore be apparently advantageous to reduce both factors, but this would be to the detriment of the capacity.

It has now been found that the said loss of power can be limited by surrounding at least part of the rotor with a layer of a second gas having a lower density than the first gas, i.e., the gas present in the remaining part of the vessel.

Additional prior art to that referred to above relating generally are: German Patent Specification No. 920,234; German Patent Application, laid open under No. 2,617,490 (Deutsche Offenlegungschrift) (equivalent to U.S. Pat. No. 4,049,133); and French Patent Applications, laid open under No. 2,310,296 and No. 2,364,060 (equivalent to U.S. Pat. No. 4,120,410).

BRIEF SUMMARY OF THE INVENTION

The invention therefore relates to a method and apparatus for the feeding of finely divided solids to a gas-containing vessel by means of a centrifugal pump comprising a rotor which is rotatably arranged in the vessel and a feed inlet mounted in a hollow shaft connected to the rotor, characterized in that at least part of the rotor is surrounded by a layer of a second gas having a lower density than the first gas.

DESCRIPTION OF THE PREFERRED EMBODIMENT

Figure 1:
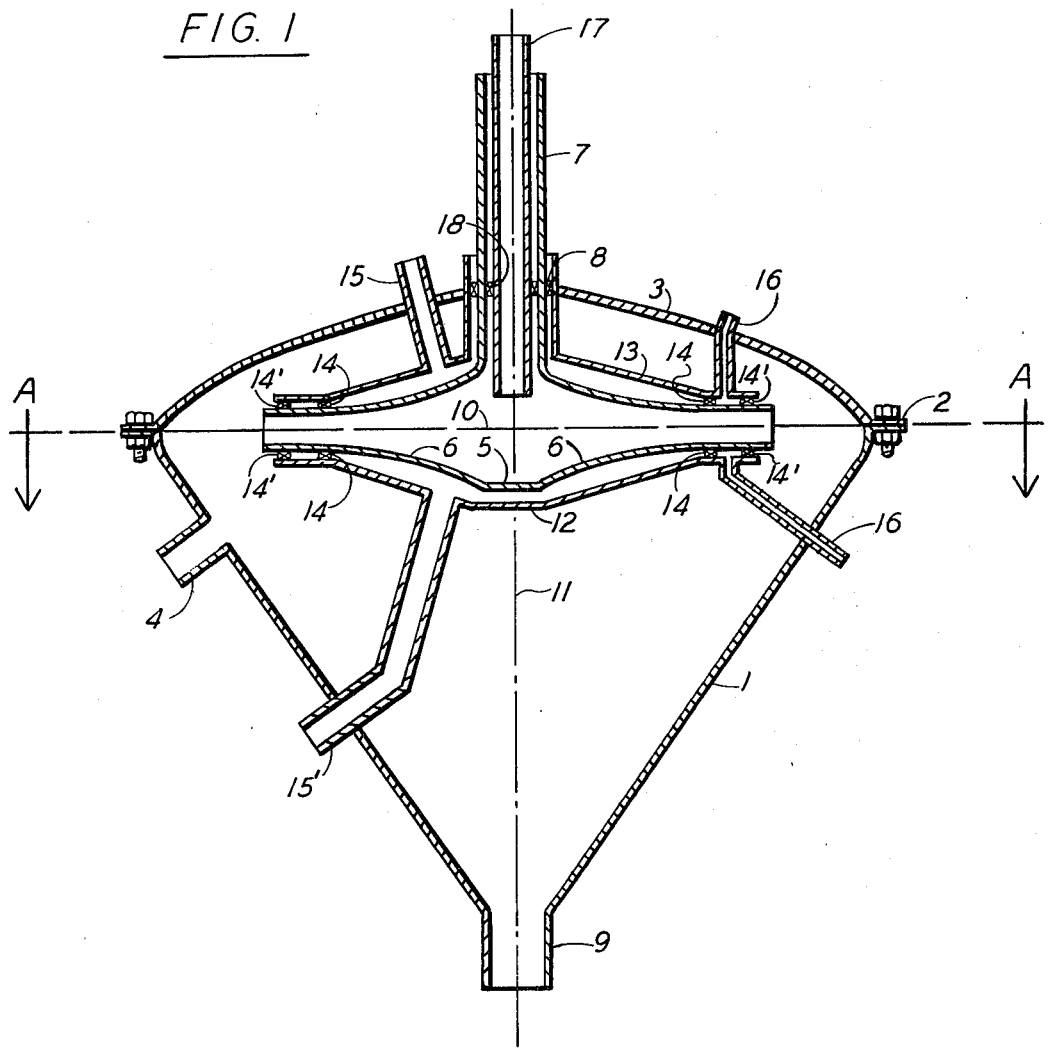
FIG. 1 is a cross-sectional view of the present invention.

The density is defined as the mass per unit volume and equals the product of the concentration, i.e., the number of gas molecules or atoms per unit volume, and the average mass of one molecule or atom. For the sake of brevity, use will further be made of the designation "molecular weight", even in the case of mixtures or mono-atomic gases.

The density of a gas can be reduced in various ways which is an additional advantage of the present invention. Thus, it is possible to reduce the pressure or the molecular weight. According to the invention the loss of rotor power decreases in both cases. The fact that the resistance does not only depend on the gas pressure enhances the possibilities of reducing friction, for reducing the pressure may present problems since some gas which is present in the vessel—outside the layer—will then invariably leak into the layer. It is now possible to maintain the layer of the second gas at a slightly higher pressure than the first gas, provided the molecular weight is reduced so that the resulting density then becomes smaller. The slightly higher pressure will then prevent displacement of the lighter gas by the heavier gas. This obviously requires a continuous, low make-up feed of light gas into the layer.

The lighter gas used can be, for example, helium, in particular if the reactivity of the solid particles necessitates the use of an inert gas, or the even lighter hydrogen, although this is flammable. It is preferred to use hydrogen, especially since this gas is available at low cost in most chemical plants and refineries where centrifugal pumps are in use.

In the case that the rotor is surrounded with a layer of a second gas at a lower pressure, steps should be taken to prevent the first gas from displacing the second gas.

Such measures are, for example, sealing with the aid of bearings or packings with internal rubbing faces which, however, produce additional resistance, and the near-sealing with the aid of bearings or packings which leave a narrow gap so that there will be no extra friction, while at the same time the leakage of gas is hindered. For this reason it is preferred to use lantern ring packings and labyrinth glands.

It is also possible to separate the first gas (heavy, high pressure) from the second gas (light, low pressure) by an intermediary layer or annulus of a third gas at a slightly higher pressure than the first and second gasses and having the same composition as the second gas. This third gas then produces still less friction than the first gas would have done if it had been in that position, while it prevents the first gas from penetrating into the space occupied by the second gas. In this case, it is also preferred to use lantern ring packings or labyrinth glands as separation between the various spaces.

There will obviously be some leakage of the third gas, in particular towards the space occupied by the second gas, but the third gas can be expelled by continuous pumping from this latter space while it is also possible, on the other hand, to return the gas expelled by pumping to the space occupied by the third gas. The excess pressure of the third gas relative to the first gas need only be small, for example 10 kilopascal (1 kPa = 1 Newton per meter$^2$ = 1 × 10$^{-6}$ bar).

As a matter of fact it is possible to design more interlayers so that a fourth, fifth, etc. gas is created. It is evident that when reference is made in this specification to a first, second and third gas, mixtures are also meant in addition to pure gasses. Notably the first gas will comprise various components, depending on the composition of the gas in the reaction space to which the centrifugal pump is connected.

The use of a second or third gas at a slightly higher pressure than the first gas permits an extra provision, that is, blow-cleaning or purging of the rotor in those locations outside the shield where no solid particles should occur, such as at the bottom and in particular at the seals. This reduces erosion and also the resistance encountered by the rotor as a result of collisions with solid particles, while the clearance in the seals can be somewhat reduced. The blow-cleaning effect can be controlled by varying the excess pressure relative to the first gas.

The application also refers to the operation and device for feeding finely divided solids to a gas-containing vessel, consisting of a centrifugal pump comprising a rotor which is rotatably arranged in the vessel and a feed inlet connected to the rotor, characterized in that at least part of the rotor is surrounded by a shield connected to the vessel and forming a virtually gas-tight seal between that part of the rotor and the gas present in the vessel and which is provided with at least one supply or discharge line for gas connected to the space between rotor and shield. The shield will preferably extend not only around the rotor but also around that part of the feed inlet tube which projects into the vessel. The central feed inlet is nearly always permanently connected to the rotor and consequently also rotates, as a result of which it is also susceptable to resistance. In this way the sealing and bearing arrangements in the upper region of the vessel are simplified.

If the rotor comprises two discs between which the solid particles are accelerated, two "shield spaces" can be designed, one above the upper disc and one below the lower disc. Evidently, the axis of the rotor may also be in a horizontal plane. The shield preferably comprises two sections which are present on either side of the rotor. These parts may be interconnected so that only one supply or discharge line for the gas is required, although it is also possible to provide each of the two parts with a separate supply/discharge line.

Figure 2:
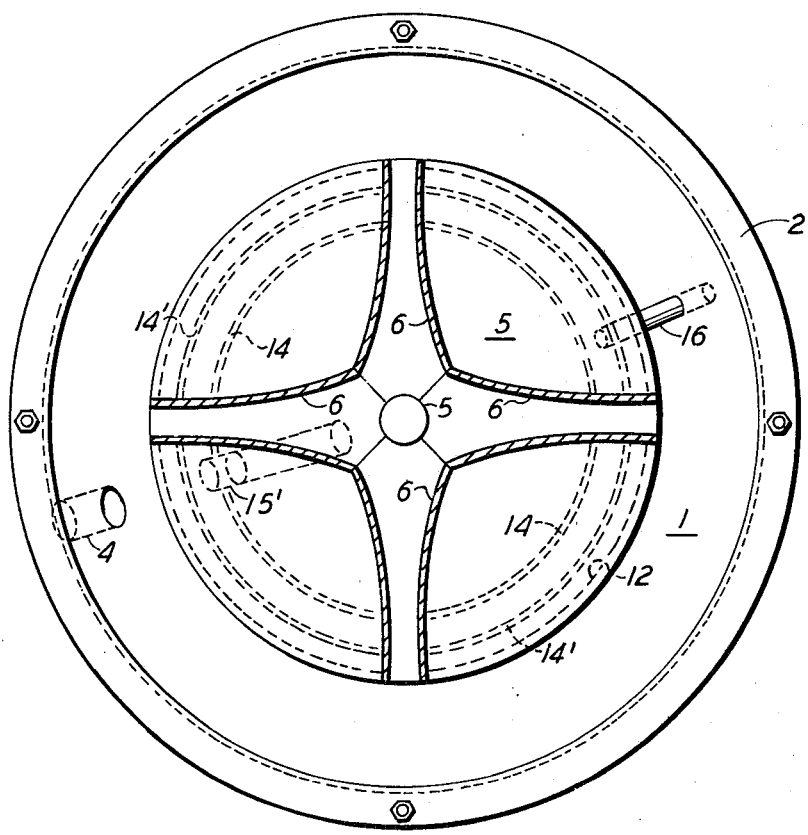
FIG. 2 is a cross-sectional view of FIG. 1 taken along line A—A, with the rotor displaced rotationally for ease of illustration.

The apparatus will now be described in detail with reference to the FIGS. 1 and 2. When referring to the FIGS. 1-2, like letters and reference numbers refer to like elements.

A vessel is depicted comprising a funnel-shaped casing 1 and a cover 3 secured thereto with the aid of a flange 2. The interior of the vessel may be filled with compressed gas via a gas supply 4. In the vessel a centrifugal pump is rotatably mounted, which pump comprises a rotor 5 provided on the inside with a number of centrifugal nozzles 6 with an integral hollow shaft 7 in which a feed inlet 17 is mounted. The hollow shaft 7 is provided with bearings at 8 in the cover 3 and 18 on the feed inlet 17 and it may be driven with arbitrary means. Through the feed inlet 17 powder may be supplied to the centrifugal nozzles 6. The vessel further comprises a passage 9 for the discharge of powder from the vessel to a high-pressure reactor (not shown).

The centrifugal nozzles 6 are directly connected to the hollow shaft 7 and are of a trumpet-shaped longitudinal cross-section. Their longitudinal axes 10 are normal to the axis 11 of the shaft 7 and the feed inlet 17. The total number of centrifugal nozzles 6 is to a certain extent dependent on the required rate of delivery of the centrifugal pump and will preferably vary between 2 and 20.

Below the rotor 5 a shield 12 is present which is secured to the casing 1 in a manner not shown. Above the rotor 5 a shield 13 is also present which is, inter alia, secured near the bearing 8 to the vessel cover 3. Seals with suitable bearings 14 seal off the spaces between the rotor 5 and the shields 12 and 13 as much as possible without causing friction. Through a discharge line 15 the upper space may be evacuated, as well as the lower space, via an analogous discharge line 15'.

The seals 14 are arranged in duplicate, in other words, two concentric rings 14 and 14' are present both in the upper and lower space. The spaces between these rings are connected to supply lines 16 and 16' for gas at a relatively high pressure.

EXAMPLE

To illustrate the method according to the invention, pulverized coal is introduced at a rate of 10 ton per hour (t/h) into a centrifugal pump in accordance with the Figures just described which pump is mounted on a coal gasifier. A mixture of nitrogen and synthesis gas at approximately 30 atmosphere (atm.) is present in the vessel. The energy consumption per hour of the centrifugal pump is approximately 150 kilowatt (kW) when the pressure and composition of the second and third gas (defined above) are identical to those of the first gas. If hydrogen at a pressure of approximately 0.01 atm. and 30.5 atm. is used as second and third gas respectively, the energy consumption is only approximately 100 kW.

The foregoing disclosure and description of the invention are illustrative and explanatory thereof, and various changes in the size, shape and materials as well as in the details of the illustrated construction may be made without departing from the spirit of the invention and all such changes are contemplated as falling within the scope of the appended claims.

I claim:

1. A method of continuously feeding finely divided solids to a vessel containing first gas, comprising the steps of:
    (a) feeding finely divided solids into a rotor rotatably arranged in the vessel;
    (b) rotating said rotor so that the solids are discharged therefrom into the vessel; and
    (c) surrounding at least a portion of the rotor with a layer of a second gas having a lower density than the first gas present in said vessel and maintaining said second gas separate from said first gas.

2. The method as defined by claim 1, wherein said second gas has a lower molecular weight than the first gas.

3. The method as defined by claim 2, wherein said second gas is hydrogen.

4. The method as defined by claim 1, wherein said second gas has a higher pressure than the first gas.

5. The method as defined in claim 1, wherein said second gas has a lower pressure than the first gas.

6. The method as defined in claim 5, wherein said first and second gasses are separated from each other by an intermediary layer of a third gas having a higher pressure than the first and second gas.

7. An apparatus for the feeding of finely divided solids to a gas-containing vessel comprising:
    (a) a rotor rotatably arranged in the vessel;
    (b) a feed inlet to said rotor for introducing finely divided solids into said rotor;
    (c) said rotor having means for discharging the finely divided solids therefrom into the vessel; and
    (d) a shield surrounding at least a portion of said rotor and forming a virtually gas-tight sealed space between the rotor and a first gas present in the vessel for receiving and maintaining a second gas therein separate from the first gas in the vessel.

8. The apparatus of claim 7, wherein:
said shield surrounds the portion of said feed inlet that projects into said vessel.

9. The apparatus of claim 7, wherein:
said shield comprises two sections, one of which is positioned above the longitudinal axis of said rotor and the second section is positioned below said rotor.

10. The apparatus of claim 7, wherein:
the space between said shield and said rotor is separated from the gas present in the vessel by means of at least one annular space sealed by virtually gas-tight seals and connected to at least one gas supply line and said shield has at least one gas discharge line.

11. The apparatus of claim 7, wherein:
said feed inlet is a hollow shaft which is connected to said rotor.

12. The apparatus of claim 7, wherein:
said second gas has a lower density than the first gas.

13. The apparatus of claim 7, including:
seal means for providing said gas-tight sealed space between said rotor and said shield.

14. The apparatus of claim 13, wherein:
said seal means includes a third gas between said rotor and said shield and at a location between the first and second gasses.

* * * * *